(12) United States Patent
Chuang

(10) Patent No.: US 7,920,447 B2
(45) Date of Patent: Apr. 5, 2011

(54) METHOD AND SYSTEM FOR CALIBRATING AN OPTIMIZED POWER

(75) Inventor: Yao-Iung Chuang, San-Chung (TW)

(73) Assignee: MEDIATEK Inc., Hsin-Chu (TW)

( * ) Notice: Subject to any disclaimer, the term of this patent is extended or adjusted under 35 U.S.C. 154(b) by 690 days.

(21) Appl. No.: 11/762,589

(22) Filed: Jun. 13, 2007

(65) Prior Publication Data
US 2008/0310269 A1 Dec. 18, 2008

(51) Int. Cl.
*G11B 5/00* (2006.01)
(52) U.S. Cl. .......... 369/47.53; 369/47.36; 369/47.48
(58) Field of Classification Search .......... 369/47.53, 369/47.48, 47.36
See application file for complete search history.

(56) References Cited

U.S. PATENT DOCUMENTS

| | | | | |
|---|---|---|---|---|
| 5,305,296 A * | 4/1994 | Kono | | 369/47.53 |
| 5,898,655 A | 4/1999 | Takahashi | | |
| 6,898,162 B2 | 5/2005 | Su et al. | | |
| 7,012,867 B2 * | 3/2006 | Kurobe et al. | | 369/47.48 |
| 7,474,597 B2 * | 1/2009 | Iwasaki | | 369/47.48 |
| 2006/0233075 A1 | 10/2006 | Yeh | | |
| 2007/0053264 A1 * | 3/2007 | Yu | | 369/47.53 |
| 2007/0115774 A1 * | 5/2007 | Hagiwara | | 369/47.53 |

FOREIGN PATENT DOCUMENTS

CN 1227654 C 11/2005
KR 1020070064828 A 6/2007

* cited by examiner

*Primary Examiner* — Thuy N Pardo

(57) ABSTRACT

The present invention sets forth a method and a system for calibrating optimized power of an optical pick-up unit of an optical disk drive. The system comprises a micro-processor, and a signal processor. The micro-processor coupled to the optical pick-up unit sets an initial power corresponding to an optical disk, and calculates a predetermined number of power levels to cover the range of the initial power for performing a recording procedure. The signal processor coupled to the micro-processor determines whether a servo state failed during optimized power calibration, and calculates recording performance of each power level. The signal processor transmits the servo state and the recording performance to the micro-processor for determining the optimized power.

20 Claims, 3 Drawing Sheets

METHOD AND SYSTEM FOR CALIBRATING AN OPTIMIZED POWER

FIELD OF THE INVENTION

The present invention generally relates to a method and a system for optimized power calibration of an optical disk drive, and more particularly, to calibrating an optimized power according to servo information.

BACKGROUND OF THE INVENTION

Conventionally, an optical disk drive executes an optimized power calibration (OPC) procedure before recoding or during recording data onto a recordable optical disk. The optimized power calibration is utilized to obtain an optimized output power of an optical pick-up unit (OPU) of the optical disk drive for insuring the recording performance.

Different optical disks have different characteristics due to different formats or different manufacturers. An identification code of each recordable optical disk can be used to determine an initial recording power of the optical recordable disk. The identification code is obtained by the optical disk drive before performing the optimized power calibration procedure. Then, the optimized power calibration procedure will be executed for calculating an optimized power of the OPU to record data onto the recordable optical disk.

Nevertheless, the result of the optimized power calibration may not be the optimal recording power if the servo control system is unstable during the optimized power calibration. The recording power of the OPU would be varied because the servo control system is in an unstable status, such as focus dropping, track-on missing (or so-called "slip out the target track") or unsteadily rotational speed of motor. Under such situation, the recording power of the OPU may not be optimized, therefore the recording performance of the recordable optical disk will be degraded.

Consequently, there is a need to provide a novel optimized power calibration for improving the recording performance of the optical disk drive and solving the problems described above.

SUMMARY OF THE INVENTION

A primary objective of the present invention is to provide an optimized power calibration method is capable of performing an optimized power calibration procedure according to servo information of the optical disk drive, comprising the following steps.

An initial power is set corresponding to an optical disk. Then a predetermined number of power levels is calculated to cover a range of the initial power and each power level is utilized to perform a recording procedure. The step of utilizing each power level to perform a recording procedure further comprises: determining a number of retry times, check whether the number of retry times is more than a first predetermined retry times, and if the number of performed retry times is more than the first predetermined retry times, terminating the recording procedure.

It is determined whether a servo state is failed during the recording procedure. If the servo state is failed during the recording procedure, repeating the step of determining whether a servo state is failed during the recording procedure. The failed servo state comprises at least one situation of focusing drop, slip or unstable rotational speed occurrence.

A recording performance of each power level is calculated. It is checked how many the amplitudes of a plurality of servo signals are smaller than a predetermined servo threshold value. In addition, it is checked whether a number of the result of above step is less than a first predetermined number. When the number of the amplitudes of the servo signals smaller than the predetermined servo threshold value is not less than a second predetermined number, repeating the step of determining whether a servo state failed during the recording procedure.

It is checked whether the amplitude of the servo signal of an $M_{th}$ smallest power level is smaller than a servo threshold value when the number of the amplitudes of the servo signals is less than a second predetermined number. The initial power is increased if the amplitude of the servo signal of the $M_{th}$ smallest power level is smaller than the servo threshold value. M is a third predetermined number.

Determining the optimized power according to the servo state and the recording performance of each power level further comprising: checking whether an asymmetric variation of a plurality of servo signals is larger than a predetermined criterion, and repeating the step of determining whether a servo state is failed during the recording procedure if the asymmetric variation is larger than the predetermined criterion.

It is determined whether the optimized power is in a predetermined range. The initial power is decreased if the optimized power is greater than the predetermined range, while the initial power is increased if the optimized power is less than the predetermined range. The optimized power information related to an identification code of the optical disk is stored in a memory.

Another objective of the present invention is to provide a system for calibrating optimized power of an optical disk drive. The system is capable of implementing the method mentioned above for calculating an optimized recording power of an optical disk.

Consequently, the advantages of the present invention include: (a) obtaining an optimized power for recording an optical disk to improve recording performance; (b) reducing the OPC time by storing an optimized power information of a specific type of an optical disk into memory; (c) reducing the OPC retry number for reserving more length of an OPC area of an optical disk.

DETAILED DESCRIPTION OF THE PREFERRED EMBODIMENTS

A method and system for calibrating an optimized power of an optical disk drive are capable of calibrating the optimized power according to servo information to calculate an optimized recording power of an optical disk.

Figure 1:
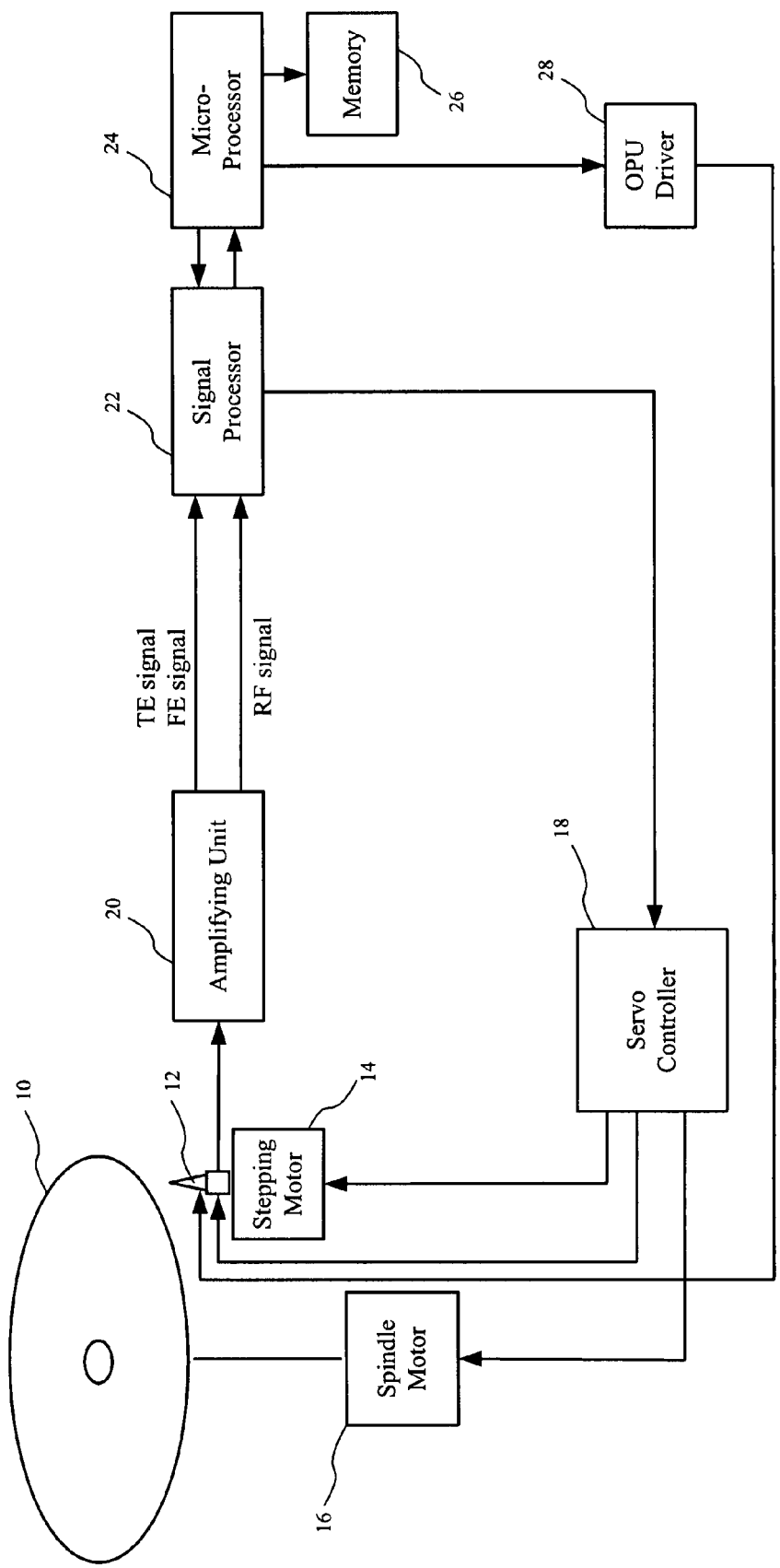
FIG. 1 illustrates a block diagram of the system for controlling optimized power calibration for an optical disk drive according to the present invention.

FIG. 1 illustrates a block diagram of a system 100 of an embodiment for controlling optimized power calibration for an optical disk drive according to the present invention. The system 100 comprises an optical pick-up unit 12, a stepping motor 14, a spindle motor 16, a servo controller 18, an amplifying unit 20, a signal processor 22, a micro-processor 24, a memory 26 and an optical pick-up unit driver (OPU driver) 28. The optical pick-up unit 12 such as a pick-up head or a laser diode of the optical disk drive, is capable of reading and/or recording an optical disk 10. The optical pick-up unit 12 is used to emit a laser light to the optical disk 10 according to a plurality of power values and receive a reflected light from the optical disk to generate a servo signal corresponding to one of the power values. The optical pick-up unit 12 is carried by the stepping motor 14 for locating the tracks on the optical disk 10. The spindle motor 16 spins the optical disk 10 when the optical pick-up unit 12 is reading or recording the optical disk 10. The micro-processor 24 controls the OPU driver 28 to perform the optimized power calibration, and when the servo state is unstable or the servo signal has a poor performance, stops the recording procedure. The OPU driver 28 is coupled to the micro-processor 24 and the optical pick-up unit 12 for controlling the operation of the optical pick-up unit 12 according to instructions from the micro-processor 24. The micro-processor 24 is capable of calculating a predetermined number of power levels to cover a range of the initial power of the optical pick-up unit 12 and directing the OPU driver 28 to control the optical pick-up unit 12 to emit light according to the power levels for performing a recording procedure. The recording procedure can be the test recording procedure or the normal recording procedure.

The servo controller 18 controls the operations of the optical pick-up unit 12, the stepping motor 14 and the spindle motor 16. The amplifying unit 20 is adapted to receive and process the signals from the optical pick-up unit 12. The amplifying unit 20 is also capable of amplifying the signals from the optical pick-up unit 12 and transmits the amplified and processed signals to the signal processor 22. In the embodiment, the amplified and processed signal is called a servo signal, such as a TE (Tracking Error) signal, an FE (Focusing Error) signal or an RF (Radio Frequency) signal. The servo signals are capable of indicating a servo state related to the stepping motor 14, the spindle motor 16, and a signal performance of the optical pick-up unit 12. The signal processor 22 determines the servo state and the servo signal performance according to at least one of the servo signals and reports to the micro-processor 24.

The servo state represents a mechanical and optical stability of the optical disk drive for checking whether a mechanical error or an optical error occurs. For example, the mechanical error may be a track-on missing or a spindle error, and an optical error may be a focus drop. The signal performance can be determined by some indexes of signal performance such as an asymmetric index of the RF signal, also called a $\beta$ index. The $\beta$ index is used to measure an error of recorded mark length by comparing positive and negative peaks of an AC-coupled readback waveform for indicating an asymmetric variation of amplitude of RF signals.

The signal processor 22 is coupled to the micro-processor 24 for determining whether a servo state is failed during the recording procedure, and calculating a recording performance of each power level, wherein the signal processor 22 transmits the servo state and the recording performance to the micro-processor 24 for determining the optimized power. The micro-processor 24 performs the optimized power calibration during the recording procedure and checks the servo state and the signal performance. When the servo state is failed, the micro-processor 24 repeats utilizing each power level to perform the recording procedure, and determines a number of retry times of optimized power calibration. Then the micro-processor 24 checks whether the number of retry times is more than a first predetermined retry times. When the number of retry times is more than the first predetermined retry times, the micro-processor 24 terminates the recording procedure. The signal processor 22 checks how many amplitudes of the servo signals are smaller than a predetermined servo threshold value and checks whether a number of the result of amplitudes of the servo signal smaller than the threshold is less than a first predetermined number. When the number of amplitudes of the servo signal smaller than the servo threshold value is not less than a second predetermined number, the micro-processor 24 repeats utilizing each power level to perform the recording procedure. When the number of the amplitudes of the servo signals smaller than the threshold is less than the second predetermined number, the signal processor 22 checks whether the amplitude of the servo signal of an $M_{th}$ smallest power level is smaller than a servo threshold value. If the amplitude of the servo signal of the $M_{th}$ smallest power level is smaller than the servo threshold value, the micro-processor 24 increases the initial power. M is a third predetermined number.

The signal processor 22 checks whether an asymmetric variation of a plurality of servo signals is smaller than a criterion. If the asymmetric variation is larger than the criterion, the micro processor 24 repeats utilizing each power levels to perform the recording procedure.

The micro-processor 24 determines whether the optimized power is in a predetermined range. If the optimized power is larger than the predetermined range, the micro-processor 24 decreases the initial power. If the optimized power is smaller than the predetermined range, the micro-processor 24 increases the initial power.

Further, if the servo state is fine and the signal performance is qualified during the recording procedure, the micro-processor 24 gets an optimized power stores an optimized power information corresponding to the optical disk into a memory 26. As a result, the optimized power calibration of another optical disk can be performed in a shorter time period if the optical disk is determined that it is similar to a former optical disk. The memory 26 may be a volatile memory such as a flash memory, or a non-volatile memory such as a random access memory (RAM). The system 100 performs the optimized power calibration according to the servo state and the signal performance of the optical disk drive for improving the recording performance of the optical disk.

Figure 2A:
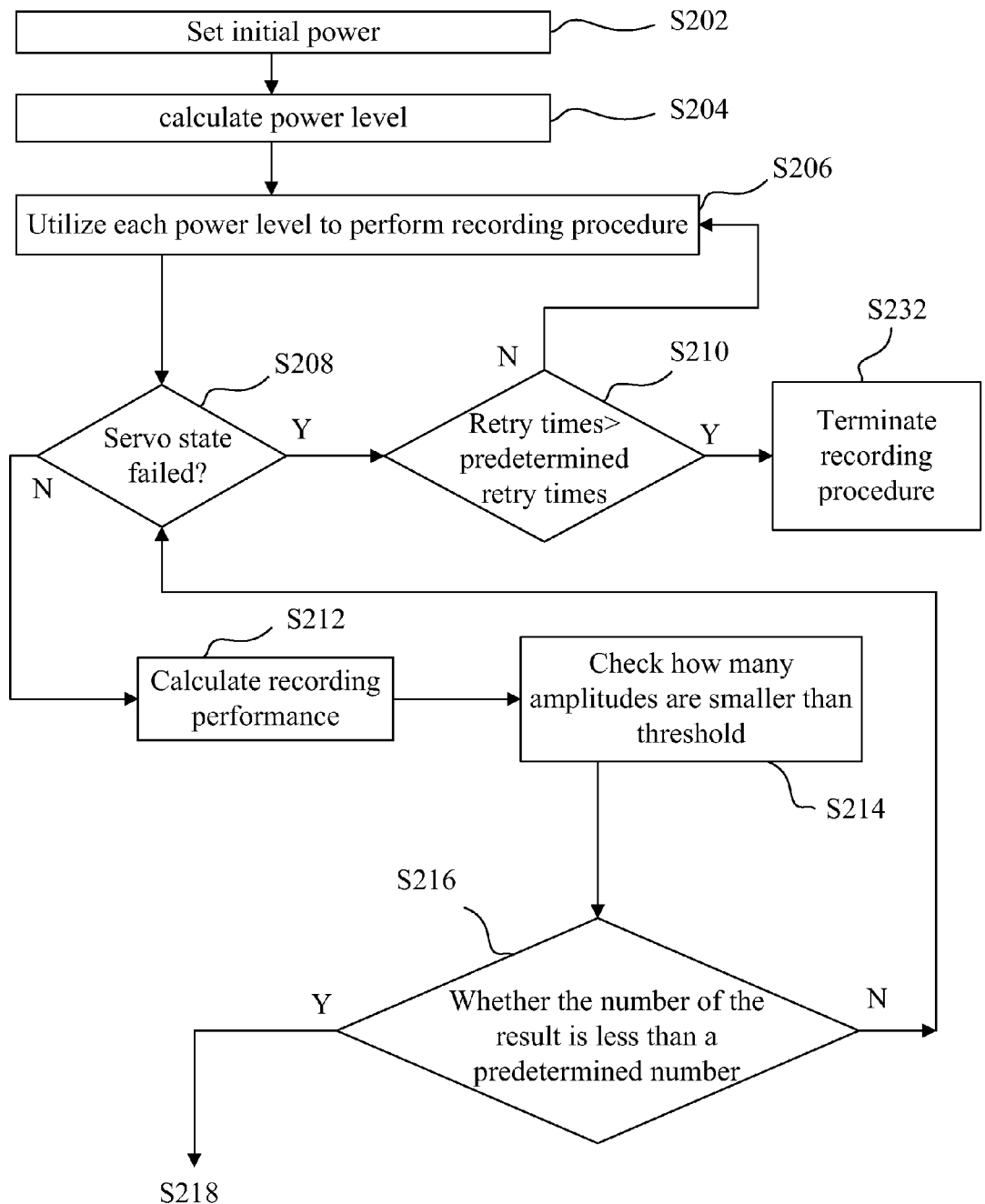
FIGS. 2A and 2B illustrate a flow chart of the method of controlling the optimized power calibration in accordance with the present invention.
Figure 2B:
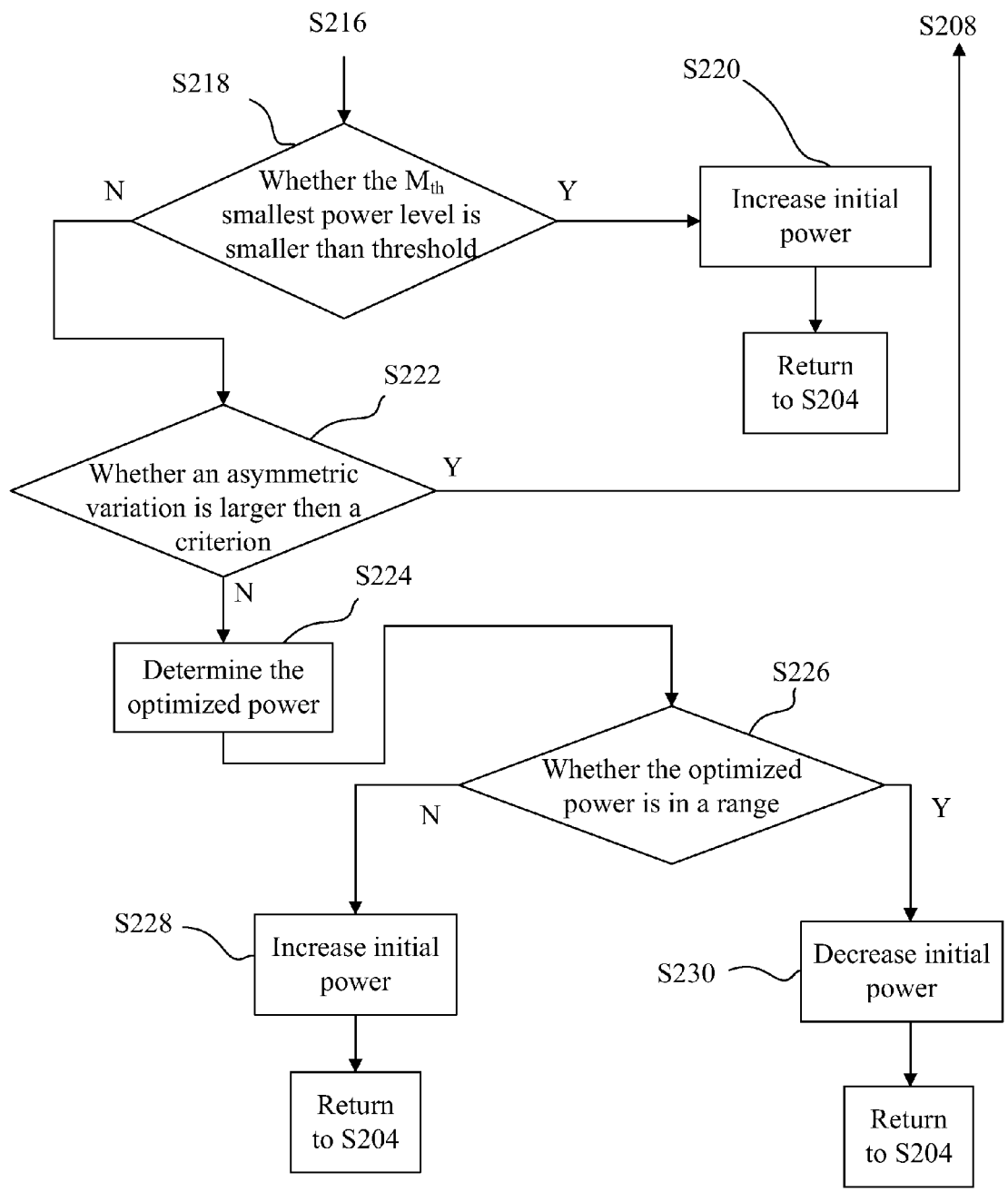

FIGS. 2A and 2B in combination illustrate a flow chart of the method of controlling the optimized power calibration in accordance with the present invention. The method is described with reference to FIGS. 2A and 2B as follows.

First, an initial power level corresponding to the optical disk drive is set (step S202). A predetermined number of power levels are calculated to cover a range of initial power of the optical pick-up unit 12 (step S204). Each of the power levels is used to record data (step S206). During recording procedure, it is checked to determine whether a servo state is failed (step S208). If failed, the determination is retired. The retry times is checked whether it exceeds a predetermined retry times (step S210). If not, the method is returned to step S206. If so, the recording procedure is terminated (step S232). If the servo state is not failed, then recording performance of each power level is calculated (step S212). It is checked how many amplitudes of plural servo signals are smaller than a predetermined servo threshold value and a result is obtained (step S214). It is determined whether the result indicating the number of amplitudes of the servo signals smaller than the threshold is less than a first predetermined number (step S216). If not, the step of checking the servo state is repeated (back to step S208). If the result is less than the first predetermined number, then it is determined whether the Mth smallest power level is smaller than the servo threshold value (step S218). Here "M" is a third predetermined number. If so, the initial power level is increased (step S220), and the method is returned to step S204. If the Mth smallest power level is not smaller than the threshold, then it is checked whether an asymmetric variation of the plural servo signals is larger than a predetermined criterion (step S222). If so, the step of checking the servo state is repeated (back to step S208). If the asymmetric variation is not larger than the criterion, then the optimized power level is determined (step S224). After the optimized power is determined, it is checked whether the optimized power level is too large (step S226). There can be a predetermined range for checking the optimized power. If the optimized power level is smaller than the range, the initial power is increased (step S228). If the optimized power level is larger than the range, then the initial power is decreased (step S230). The whole method can be circulated.

The present invention provides a system and a method for calibrating an optimized power of an optical disk drive. The system and a method for calibrating an optimized power of an optical disk drive are capable of performing an optimized power calibration procedure according to servo information of the optical disk drive and obtaining an optimized recording power corresponding to an optical disk.

As is understood by a person skilled in the art, the foregoing preferred embodiments of the present invention are illustrative rather than limiting of the present invention. It is intended that they cover various modifications and similar arrangements be included within the spirit and scope of the appended claims, such as simply combined the signal processor and the micro-processor as described above, the scope of which should be accorded the broadest interpretation so as to encompass all such modifications and similar structure.

What is claimed is:

1. An optimized power calibration method for calibrating an optimized power of an optical pick-up unit of an optical disk drive, comprising the steps of:
   (a) setting an initial power corresponding to an optical disk;
      (a1) calculating a predetermined number of power levels to cover a range of the initial power; and
      (a2) utilizing each power level to record data;
   (b) determining whether a servo state is failed during the recording procedure;
   (c) calculating a recording performance of each power level; and
   (d) determining the optimized power according to the servo state and the recording performance of each power level.

2. The method of claim 1, the step (b) further comprising:
   if the servo state failed during the recording procedure, repeating the step (a2).

3. The method of claim 2, before the step of repeating the step (a2), further comprising the steps of:
   determining a number of retry times;
   checking whether the number of retry times is more than a first predetermined retry times; and
   terminating the recording procedure when the number of retry times is more than the first predetermined retry times.

4. The method of claim 1, after the step (c) further comprising the steps of:
   checking how many the amplitudes of a plurality of servo signals are smaller than a predetermined servo threshold value; and
   checking whether a number of the result of above step is less than a first predetermined number.

5. The method of claim 4, further comprising the steps of:
   repeating the step (a2) when the number of the amplitudes of the servo signal smaller than the predetermined servo threshold value is not less than a second predetermined number.

6. The method of claim 4, further comprising a step of:
   checking whether the amplitude of the servo signal of an $M_{th}$ smallest power level is smaller than a servo threshold value when the number of the amplitude of the servo signal is less than a second predetermined number, wherein M is a third predetermined number; and
   increasing the initial power if the amplitude of the servo signal of the $M_{th}$ smallest power level is smaller than the servo threshold value.

7. The method of claim 1, before the step (d) further comprising the steps of:
   checking whether an asymmetric variation of a plurality of servo signals is larger than a predetermined criterion; and
   repeating the step (a2) if the asymmetric variation is larger than the predetermined criterion.

8. The method of claim 1, further comprising a step of:
   storing the optimized power information related to an identification code of the optical disk in a memory.

9. The method of claim 1, after the step (d), further comprising the steps of:
   determining whether the optimized power is in a predetermined range;
   increasing the initial power if the optimized power is larger than the predetermined range; and
   decreasing the initial power if the optimized power is smaller than the predetermined range.

10. The method of claim 1, wherein the failed servo state comprises at least one situation of focusing drop, slip or unstable rotational speed occurs.

11. An optimized power calibration system for calibrating an optimized power of an optical pick-up unit of an optical disk drive, comprising: a micro-processor couple to the optical pick-up unit for setting an initial power corresponding to an optical disk, and calculating a predetermined number of power levels to cover a range of the initial power for performing a recording procedure; and
   a signal processor coupled to the micro-processor for determining whether a servo state failed during the recording procedure, and calculating a recording performance of each power level;
   wherein the signal processor transmits the servo state and the recording performance to the micro-processor for determining the optimized power.

12. The system of claim 11, wherein the micro-processor repeats utilizing each power level to perform the recording procedure if the failed servo state is determined.

13. The system of claim 12, wherein the micro-processor determines a number of retry times of optimized power calibration, checks whether the number of retry times is more than a first predetermined retry times, and terminates the recording procedure when the number of retry times is more than the first predetermined retry times.

14. The system of claim 11, wherein the signal processor checks how many the amplitudes of the servo signals are smaller than a predetermined servo threshold value and checks whether a number of the result of amplitudes of the servo signal is less than a first predetermined number.

15. The system of claim 14, wherein the micro-processor repeats utilizing each power level to perform the recording procedure when the number of amplitudes of the servo signal smaller than a servo threshold value is not less than a second predetermined number.

16. The system of claim 14, wherein the signal processor checks whether the amplitude of the servo signal of an $M_{th}$ smallest power level is smaller than a servo threshold value when the number of the amplitude of the servo signal is less than a second predetermined number; and the micro-processor increases the initial power if the amplitude of the servo signal of the $M_{th}$ smallest power level is smaller than the servo threshold value; wherein M is a third predetermined number.

17. The system of claim 11, wherein the signal processor checks whether an asymmetric variation of a plurality of servo signals is smaller than a criterion; and if the asymmetric variation is larger than the criterion, the micro processor repeats utilizing each power levels to perform the recording procedure.

18. The system of claim 11, further comprising a memory coupled to the micro-processor for storing the optimized power information related to an identification code of the optical disk in the memory.

19. The system of claim 11, wherein the micro-processor determines whether the optimized power is in a predetermined range, if the optimized power is larger than the predetermined range, the micro-processor increases the initial power, if the optimized power is smaller than the predetermined range, the micro-processor decreases the initial power.

20. The system of claim 11, wherein the failed servo state comprises at least one situation of focusing drop, slip or unstable rotational speed occurs.

* * * * *